Jan. 19, 1971  G. NUGHES  3,556,816
FLEXIBLE PACKAGE FOR FOODSTUFF
Filed Oct. 21, 1968

Fig_2

3,556,816
FLEXIBLE PACKAGE FOR FOODSTUFF
Giovanni Nughes, Milan, Italy, assignor to Star Stabilimento Alimentare S.p.A., Milan, Italy
Filed Oct. 21, 1968, Ser. No. 769,351
Claims priority, application Italy, Oct. 27, 1967,
53,521/67
Int. Cl. B65d *31/02;* B32b *27/08*
U.S. Cl. 99—171                               7 Claims

ABSTRACT OF THE DISCLOSURE

A heat-sealed flexible-walled food container is formed of laminated material comprising an aluminium foil provided on both surfaces with polyester layers and an inner polypropylene layer bonded to one of the polyester layers, the aluminum foil and polyester layers forming a thermally balanced laminate, which prevents the formation of microscopic cracks in the aluminum resulting from thermal stresses. Cracking of the aluminium foil by subsequent heat treatment such as sterilisation is prevented.

---

Figure 1:
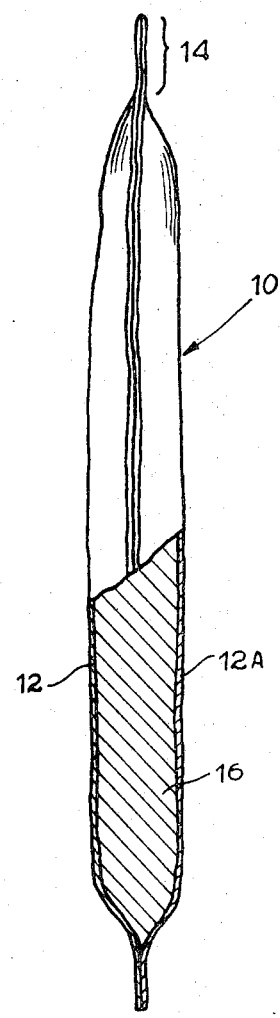
Figure 1:
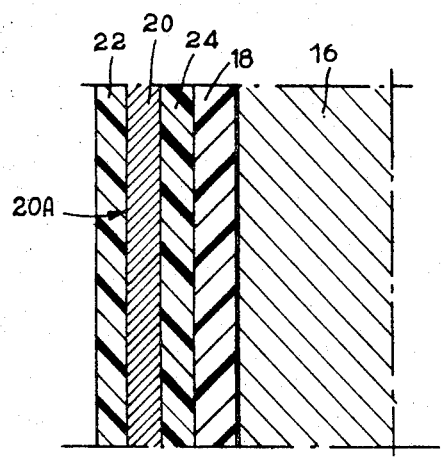

This invention relates to flexible laminated material and to flexible-walled containers formed from such material, particularly such containers as used for food products.

The invention has particular, but not exclusive, relevance, to flexible-walled food containers which can be heat-treated after filling to sterilise their contents or to cook or heat the contents prior to serving.

Flexible-walled containers of this kind are generally made from a flexible laminated material having as an inner lining a layer of non-orientated, or mono- or bi-orientated polypropylene. Polypropylene as such complies with public health regulations governing containers for food products: it is not difficult to obtain a polypropylene layer which is completely free of substances such as plasticizers which are not permitted by the regulations. Moreover, polypropylene satisfactorily withstands heat-treatment at temperatures of the order of 125° C., which is necessary for sterilisation, and adjoining polypropylene layers can be heat-sealed together when forming a sealed container.

However, a polypropylene layer is permeable to actinic, more particularly, ultra-violet, radiation and is not fully gas-tight. Therefore, a laminated material of the above type usually includes a "barrier" layer made of aluminium foil bonded by heat with the polypropylene layer. The procedure for laminating by heat is well known in this art and therefore requires no further explanation in the present specification. An aluminium foil having a thickness of at least 20 microns is free from microscopic holes and as such can form an effective barrier layer for the present purpose.

It is, however, necessary to protect the aluminium foil against chemical attack externally to avoid corrosion. Such protection is obtained by coating the outer surface of the aluminium foil with a polyester layer such as polyethylene terephthalate. The polyester layer additionally protects any inscriptions or patterns printed on the outer surface of the aluminium foil. The resulting flexible laminated material is therefore made up of three component layers.

It has been found in practice that such three-component laminated materials do not provide the degree of protection against ultraviolet radiation, or the degree of gas-tightness, expected. Microscopic examination of such materials revealed that the aluminium foil, which was initially entirely free of microscopic holes, subsequently exhibited a dense network of microscopic cracks when formed into containers, particularly containers which have undergone a sterilising treatment at a temperature of 121°–125° C.

Further investigation disclosed that a corresponding network of cracks, albeit in an embryo state, already existed in the laminated material before the latter had undergone any treatment of a mechanical nature (creasing or the like) which might have given rise to such cracks. Moreover, when the material contained layers of mono- and bi-orientated polypropylene the formation of microscopic cracks was not noticeably more accentuated than with materials containing non-orientated polypropylene layers.

It is thought, therefore, that interactions of a mechanical nature occur between the polypropylene layer and aluminium foil. Such interactions can be attributed to the different coefficients of thermal expansion of the polypropylene and the aluminium during lamination by heat and during sterilisation or similar heat treatments carried out on containers made from the material.

An object of the present invention is to provide an improved flexible laminated material which is free from the abovementioned drawbacks, and a flexible-walled container made from such material.

Accordingly the invention provides a flexible laminated material comprising an aluminium foil provided with polyester layers on both its surfaces and a polypropylene layer bonded to one of said polyester layers.

The invention also provides a container having walls formed from such flexible laminated material, the polypropylene layers being disposed on the interior of the container.

The polyester layers are thought to inhibit the interaction of the polypropylene layer and the aluminium foil. It has been found advantageous to "balance" the aluminium foil by making the two polyester layer of exactly the same material. Balancing is further improved by employing polyester layers of substantially the same thickness.

The polypropylene layer is preferably constituted by 60–80 g./sq. m. film and each polyester layer is conveniently formed of 14–18 g./sq. m. film. These particular film densities apply to laminated materials used in flexible-walled containers of the size in widest public use, typically 16 x 20 cm. envelopes; for larger containers the film thicknesses would be increased. The thickness of the aluminium foil is actually unrelated to the size of the container or the weight of its contents. Usually 20–25 g./sq. m. foil can be employed. The foil should not be less than 20 microns thick in order to avoid microscopic holes in the foil initially.

Though the use of the invention also affords appreciable improvements when using layers of mono- and bi-orientated polypropylene, such as that known by the trade name Moplefan of the Ott brand, optimum results are obtained with non-orientated polypropylene such as that known by the trade name Moplefan of the BT brand. The polyester layers may advantageously be made from the material known by the trade name Mylar, T brand (polyethylene terephthalate) distributed by E. I. du Pont de Nemours and Co. Inc.

It has moreover been found that the sequence followed in laminating the four constituent layers of the material is of importance for successful results. More particularly, a process for manufacturing the laminated material according to the invention comprises first bonding the two polyester layers to the aluminium foil and then bonding the polypropylene layer to one of the polyester layers. All the bonding steps are carried out by heating in accordance with known techniques, advantageously by a continuous process. In this way the aluminium foil is "balanced" before being laminated with the polypropylene layer and is therefore better able to withstand the various thermal contractions occurring on cooling of the resulting four-component laminated material, without microscopic cracks being formed.

The invention will be more clearly understood from the following description, given by way of example, with reference to the accompanying drawings, in which:

FIG. 1 is a side elevational view, partly in section, of a flexible-walled container according to the invention, and FIG. 2 is a cross-section, on an enlarged scale, through a wall of the container of FIG. 1, made from laminated material according to the invention.

The container of FIG. 1 comprises a rectangular envelope 10 made from two similar sheets 12, 12A of flexible laminated material which are heat-sealed together throughout a continuous peripheral region along a marginal band 14 which is, for example 6 to 8 mm. wide. A food product 16 is sealed within the envelope 10. The food product 16 may, for example, comprise a pre-cooked dish which is sterilised in the envelope 10 after sealing of the latter by heating the filled envelope to and maintaining it for a predetermined time interval at a temperature of 121–125° C.

The laminated material of each sheet 12, 12A has an inner layer 18 comprising a film of non-orientated polypropylene of density 80 g./sq. m. Aluminium foil 20, of density 20 g./sq. m., which can be printed on its outer face 20A, is enclosed between two layers 22, 24 of 18 g./sq. m. polyester film. The two polyester layers 22, 24 are previously bonded by heat to the surfaces of the aluminium foil 20, following which step one of the polyester layers (24) is bonded by heat to the polypropylene film 18.

The properties of the laminated material according to the invention are illustrated by the tests described below by way of example.

TEST NO. 1

A laminated material as described above with reference to the drawings was subjected to an ultra-violet radiation permeability test.

For this purpose a 6 x 9 cm. rectangle of the laminated material was placed on a panchromatic planar 6 x 9 cm. photographic film in a photographic press and exposed to to radiation from an ultraviolet lamp for one minute. After developing the film and printing on a sheet of glossy white photographic paper no darkened points were ascertained on the paper, indicating that the laminated material had substantial impermeability to ultraviolet radiation.

TEST NO. 2

A laminated material similar to that used in Test No. 1, but devoid of the intermediate polyester layer 24, was submitted to the Test No. 1. Scattered darkening in the form of minute scratches and dots, some of which were visible with the naked eye, were ascertained on the photographic paper after printing.

TEST NO. 3

Test No. 1 was repeated on a sample of the laminated material according to the invention cut from a wall of a container containing stew previously subjected to sterilisation at 121° C. and "ill-treated" on a shaker during one hour. No darkening appeared on the photographic paper.

TEST NO. 4

Test No. 2 was repeated on a sample of the laminated material devoid of layer 24, prepared as described in Test No. 3. A large number of scattered black spots, clearly visible to the naked eye, appeared on the photographic paper after printing.

What is claimed is:

1. A flexible laminated food package that will be subject to sudden temperature changes and capable of protecting the food at temperatures above 100° C., the package comprising: an aluminium foil, two polyester layers, one bonded on each surface of the aluminium foil, and a polypropylene layer bonded to the polyester layer adjacent the food, whereby the polyester layers provide a thermally balanced laminate with the aluminium foil to prevent the formation of any microscopic cracks in the aluminium that could result from the thermal stresses generated by sudden changes in temperature.

2. A flexible laminated food package as claimed in claim 1, in which the two polyester layers are formed of the same material.

3. A flexible laminated food package as claimed in claim 2, in which the two polyester layers have substantially the same thickness.

4. A flexible laminated food package as claimed in claim 3, in which the polypropylene layer has a density of 60–80 grams per square metre.

5. A flexible laminated food package as claimed in claim 4, in which the polyester layers each have a density of 14–18 grams per square metre.

6. A flexible laminated food package as claimed in claim 1, in which the aluminium foil has a thickness of not less than 20 microns and a density approximately 20 g./m.$^2$.

7. Process for manufacturing flexible laminated material comprising an aluminium foil, two polyester layers provided on both surfaces of the aluminium foil, and a polypropylene layer bonded to one of said polyester layers, the process comprising the steps of first bonding the two polyester layers to the aluminium foil to form a thermally balanced laminate for preventing the formation of microscopic cracks that could result from the application of sudden changes in temperature, and then bonding the polypropylene layer to one of said polyester layers.

References Cited

UNITED STATES PATENTS

| | | | |
|---|---|---|---|
| 2,902,396 | 9/1959 | Reynolds | 99—171 |
| 3,381,818 | 5/1968 | Cope et al. | 161—214 |

FRANK W. LUTTER, Primary Examiner

W. L. MENTLIK, Assistant Examiner

U.S. Cl. X.R.

156—60; 161—214, 231, 254